C. H. GUILES.
RIM TOOL.
APPLICATION FILED JAN. 3, 1919.
1,301,839.
Patented Apr. 29, 1919.
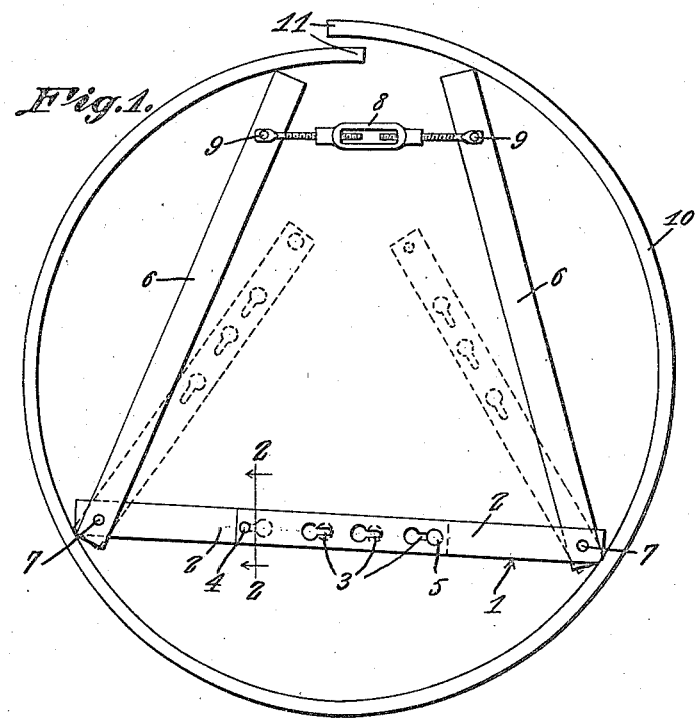
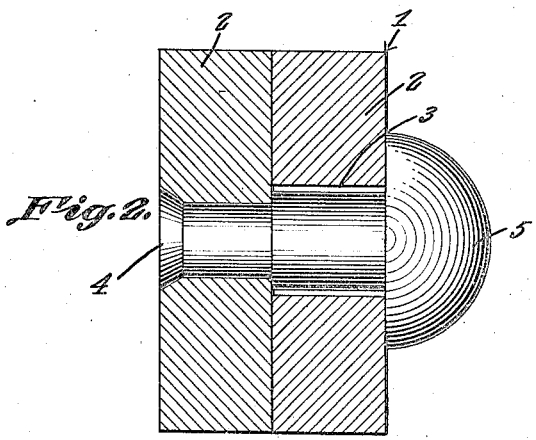
C. H. Guiles, Inventor

UNITED STATES PATENT OFFICE.

CHARLES H. GUILES, OF ADDISON, NEW YORK.

RIM-TOOL.

1,301,839.　　　　　Specification of Letters Patent.　　Patented Apr. 29, 1919.

Application filed January 3, 1919.　Serial No. 269,422.

*To all whom it may concern:*

Be it known that I, CHARLES H. GUILES, a citizen of the United States, residing at Addison, in the county of Steuben and State of New York, have invented a new and useful Rim-Tool, of which the following is a specification.

It is the object of this invention to provide a simple but efficient means for expanding a demountable rim within a vehicle tire.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, changes in the precise embodiment of the invention shown can be made without departing from the spirit of the invention.

In the accompanying drawings:—

Figure 1 shows in side elevation, a device constructed in accordance with the invention, located within the rim; Fig. 2 is a cross section on the line 2—2 of Fig. 1.

In carrying out the invention there is provided a base member 1 made up of bars 2 having their inner ends overlapped. Adjacent to their ends, the constituent parts 2 of the base member 1 are provided with projections 4, which may be rivets, having heads 5. Inwardly of the projections 4, the parts 2 of the base member 1 are supplied with keyhole slots 3. Rim engaging bars 6 are pivoted at 7 to the outer ends of the parts 2 of the base member 1. The rim engaging bars 6 are connected by a turn buckle 8 pivoted to the bars 6.

The numeral 10 denotes a demountable rim having relatively movable ends 11. In practical operation, the ends of the base member 1 rest on the inner curve of the rim 10, those ends of the bars 6 which are adjacent to the turn buckle 8 engaging the inner curve of the rim near to the relatively movable ends 11 of the rim. By operating the turnbuckle 8, the extremities of the bars 6 which are adjacent to the movable ends 11 of the rim 10 may be forced in opposite directions, thereby causing the ends 11 of the rim to coöperate in the well known way. Since the base member 1 is longitudinally adjustable, the base member may be made of such a length that when its ends rest on the rim 10, the upper extremities of the bars 6, in Fig. 1, will be positioned properly with respect to the ends 11 of the rim, it being understood, of course, that the projection 4 on one part 2 of the base member 1 may be engaged in any of the keyhole slots 3 in the other part of the base member. The bars 6 and the bars 2 of the base member 1 may be of any desired cross section.

Having thus described the invention, what is claimed is:—

1. A rim expander comprising a multi-part base member; means for connecting the parts of the base member adjustably to vary the length thereof; rim engaging bars each pivoted at one end to the outer end of one of the parts of the base member; and an expansion means connecting the other ends of the rim engaging bars.

2. A rim expander comprising a multi-part base member; a projection and keyhole slot connection between the parts of the base member, constituting means whereby the length of the base member may be varied; rim engaging bars each pivoted at one end to the outer end of one of the parts of the base member; and a turnbuckle connecting the other ends of the rim engaging bars.

In testimony that I claim the foregoing as my own, I have hereto affixed my signature in the presence of two witnesses.

CHARLES H. GUILES.

Witnesses:
　GEO. LE MEMYHN,
　M. E. NICHOLS.

Copies of this patent may be obtained for five cents each, by addressing the "Commissioner of Patents, Washington, D. C."